United States Patent [19]
Das et al.

[11] Patent Number: 6,046,259
[45] Date of Patent: *Apr. 4, 2000

[54] STABLE AQUEOUS DISPERSIONS OF CELLULOSE ESTERS AND THEIR USE IN COATINGS

[75] Inventors: Suryya K. Das, Fox Chapel Boro.; Soner Kilic; Robyn E. McMillan, both of Hampton Twp., all of Pa.

[73] Assignee: PPG Industries Ohio, Inc., Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/669,815

[22] Filed: Jun. 27, 1996

[51] Int. Cl.⁷ ............................................. C08L 1/14
[52] U.S. Cl. .................. 524/40; 524/37; 524/38; 524/39; 524/41; 524/457; 524/502; 524/512; 524/733
[58] Field of Search ............... 524/37, 41, 733, 524/512, 457, 502, 38, 39, 40

[56] References Cited

U.S. PATENT DOCUMENTS

| | | | |
|---|---|---|---|
| 3,607,799 | 9/1971 | Barbehenm . | |
| 3,953,386 | 4/1976 | Murphy et al. | 260/17 A |
| 4,011,388 | 3/1977 | Murphy et al. | 526/320 |
| 4,221,683 | 9/1980 | Nakate et al. | 524/512 |
| 4,352,902 | 10/1982 | Nakayama et al. | 524/458 |
| 4,413,036 | 11/1983 | Drexler et al. | 428/458 |
| 4,446,261 | 5/1984 | Yamasaki et al. | 524/457 |
| 4,532,277 | 7/1985 | Wingler | 524/40 |
| 4,546,046 | 10/1985 | Etzell et al. | 524/512 |
| 4,598,111 | 7/1986 | Wright et al. | 524/40 |
| 4,616,058 | 10/1986 | Yabuta et al. | 524/457 |
| 4,812,495 | 3/1989 | Sand | 524/40 |
| 4,888,372 | 12/1989 | Abrams et al. | 524/197 |
| 4,970,247 | 11/1990 | Hoppe et al. | 524/31 |
| 5,011,874 | 4/1991 | Hoppe et al. . | |
| 5,334,638 | 8/1994 | Kuo et al. | 524/40 |
| 5,384,163 | 1/1995 | Budde et al. | 427/385.5 |
| 5,418,014 | 5/1995 | Kuo et al. | 427/389 |
| 5,728,769 | 3/1998 | Natesh et al. | 524/591 |
| 5,739,194 | 4/1998 | Natesh et al. | 524/457 |

FOREIGN PATENT DOCUMENTS

| | | |
|---|---|---|
| 069 936 B1 | 7/1981 | European Pat. Off. . |
| 352800 | 7/1988 | European Pat. Off. . |
| 0 339 415 | 11/1989 | European Pat. Off. . |
| 0 365 957 | 5/1990 | European Pat. Off. . |
| 2 066 423 | 8/1971 | France . |

*Primary Examiner*—Judy M. Reddick
*Attorney, Agent, or Firm*—Dennis G. Millman; Kenneth J. Stachel

[57] ABSTRACT

A stable aqueous dispersion containing cellulose ester, the dispersion being polymeric microparticles comprised of cellulose ester and a polymer formed from at least two different vinyl monomers of which at least one vinyl monomer is polyethylenically unsaturated. The dispersion of microparticles is formed by a high stress technique prior to polymerization of the vinyl monomers in the presence of the cellulose ester. Typically the dispersion also contains surfactant. A method of making the stable, cellulose ester-containing aqueous dispersion by (a) mixing together a cellulose ester, at least two vinyl monomers of which at least one vinyl monomer is polyethylenically unsaturated, surfactant, and water to form an emulsion; (b) particulating the emulsified mixture of (a) into microparticles by a high stress technique; and (c) copolymerizing the vinyl monomers in the cellulose ester-containing particulated emulsion of (b) to form a crosslinked polymer within the microparticles of the dispersion. Also aqueous coating compositions formed from the stable cellulose ester containing aqueous dispersion; crosslinking material; and, optionally, additional film forming resins. The aqueous coating compositions can also contain pigments. The coating compositions are very advantageous, particularly in automotive base coats containing metallic pigments and exhibit good humidity resistance, appearance, adhesion and chip resistance when used in an automotive "low bake repair" process.

18 Claims, No Drawings

STABLE AQUEOUS DISPERSIONS OF CELLULOSE ESTERS AND THEIR USE IN COATINGS

BACKGROUND OF THE INVENTION

The present invention relates to aqueous polymeric dispersions, a method of making aqueous polymeric dispersions, and coating compositions containing aqueous dispersions.

Color-plus-clear coating systems involving the application of colored or pigmented base coat to a substrate followed by the application of transparent or clear topcoat to the base coat are becoming increasingly popular as original finishes for automobiles. Automotive base coats containing metallic pigments such as aluminum flake are generally utilized to obtain a desired lustrous appearance.

Over the past several years, there has been a trend in the automotive industry toward the reduction of atmospheric pollution caused by the volatile organic solvents which may sometimes be emitted during the painting process. One approach to emissions control has been the use of waterborne coatings compositions as the pigmented color coat or base coat in the color-plus-clear system.

A major problem associated with waterborne base coats containing metallic pigment is that without the proper rheology properties, an undesirable appearance of non-uniform areas of light and dark color can result after application of the base coat to the substrate because the metallic flakes may lack the proper orientation or not be uniformly orientated across the surface of the substrate. This condition of non-uniformity of color is commonly referred to as mottle or mottling. It is known that cellulose esters can be used as rheology control agents in both solventborne and waterborne coatings to control metallic flake orientation.

U.S. Pat. No. 5,334,638 describes an aqueous dispersion containing a hydrolyzed cellulose ester and an acrylic resin, having free acid functionalities that are at least partially neutralized, which can be used in a coating composition. The cellulose ester was blended with the acrylic resin to form a dispersion in water. The acrylic resin is not polymerized in the presence of the cellulose ester.

U.S. Pat. No. 5,384,163 describes the use of cellulose esters modified with anhydrides of dicarboxylic acids as rheology control agents in waterborne base coats.

U.S. Pat. No. 4,970,247 describes aqueous dispersion polymers containing nitrocelluloses and other polymerizable monomers. The dispersions are useful in nitrocellulose lacquers that will dry without cloudiness. Nitrocellulose lacquers are typically too high in volatile organic content to be used as automotive coating compositions because of environmental regulations.

U.S. Pat. Nos. 3,953,386 and 4,011,388 describe aqueous homogeneous polymer emulsions containing cellulosic esters and acrylic polymers. The acrylic monomers are chosen so as to obtain polymers that are substantially non-grafted and non-crosslinked. When dispersions containing non-crosslinked polymers in the dispersed particles are used in base coat compositions of color-plus-clear coating systems, there can be problems associated with "soak in" of the subsequently applied clear coat. "Soak-in" occurs when the solvent from the subsequently applied clear coat partially dissolves the non-crosslinked polymers, thereby allowing metallic flakes in the base coat to move and disorientate themselves. Another consequence of "soak-in" can be low gloss or sometimes a hazy appearance of the resultant film.

In the automotive industry, after a car body has been coated with an organic coating composition, the body is then "trimmed out," i.e., the assembly of the car is completed by attaching the interior parts and the exterior parts, including the engine, drive train, wheels and tires, windshields, backlights, and the glass side windows. During this assembly process, the coating on the surface of the body can be damaged thereby necessitating a repair or repainting of the affected area of the body. Because the car has been essentially totally assembled, the same coating process used to originally coat the body cannot be used to repair the coated body. Generally, a fully assembled vehicle cannot be subjected to the relatively high cure temperatures used to cure the original coatings because the vehicle contains many plastic parts that would melt or become distorted or inoperable if subjected to those elevated temperatures. As a result the industry has developed a "low bake repair" process where the assembled vehicle is repaired with coatings that are capable of or that have been modified to cure at a low temperature such that the plastic parts on the vehicle will not melt or distort. The original base coats normally are used as the repair coatings to minimize any variation in color between the repaired areas and the rest of the body. The original coatings are sometimes modified to cure at "low bake" temperatures by adding additional catalyst to the coatings. It has been found that at the low cure temperatures used in the "low bake repair" process it is very difficult to obtain equivalent properties as an original finish coating, such as humidity resistance, appearance, adhesion, and chip resistance.

It is desirable, therefore, to have aqueous coating compositions that have excellent resistance to mottling and also exhibit acceptable humidity resistance, appearance, adhesion, and chip resistance when used in a "low bake repair" process.

SUMMARY OF THE INVENTION

In accordance with the present invention, there is provided a stable aqueous dispersion containing cellulose ester, the dispersion comprising polymeric microparticles comprised of cellulose ester and a polymer formed from at least two different vinyl monomers of which at least one vinyl monomer is polyethylenically unsaturated. The dispersion of microparticles is formed by a high stress technique prior to polymerization of the vinyl monomers in the presence of the cellulose ester. Typically the dispersion also contains surfactant.

Also provided is a method of making the stable, cellulose ester-containing aqueous dispersion by (a) mixing together a cellulose ester, at least two vinyl monomers of which at least one vinyl monomer is polyethylenically unsaturated, surfactant, and water to form an emulsion; (b) particulating the emulsified mixture of (a) into microparticles by a high stress technique; and (c) copolymerizing the vinyl monomers in the cellulose ester-containing particulated emulsion of (b) to form a crosslinked polymer within the microparticles of the dispersion.

Also provided is an aqueous coating composition comprising the stable cellulose ester containing aqueous dispersion described above; crosslinking material; and, optionally, additional film forming resins. The aqueous coating composition can also contain pigments.

As automotive waterborne base coat compositions, the compositions of the present invention are very advantageous, particularly in base coats containing metallic pigments. The compositions have good leveling and flow characteristics and exhibit an excellent automotive quality finish. In addition, the coating compositions exhibit good humidity resistance, appearance, adhesion and chip resistance when used in a "low bake repair" process. The compositions also have low volatile organic content. Generally the volatile organic content is less than 3.5 pounds per gallon. In addition, the claimed coating compositions used as base coats are very versatile and can be utilized with a variety of clear coating compositions as topcoats including solvent borne clear coats, waterborne clear coats and powder clear coats.

DETAILED DESCRIPTION OF THE INVENTION

The stable cellulose ester-containing aqueous dispersion of this invention comprises cellulose ester, and a polymer formed from at least two different vinyl monomers of which at least one vinyl monomer is polyethylenically unsaturated. The dispersion normally also contains surfactant.

The aqueous dispersion composition of the present invention generally contains at least about 5 percent of cellulose ester, preferably from about 10 to 30 percent by weight, based on resin solids of the dispersion. Normally, the cellulose ester is dissolved in the vinyl monomers prior to emulsification, and it has been shown that it is difficult to dissolve amounts greater than 40 percent by weight of cellulose ester. Also when greater than 40 percent is used, the resilient mixture is usually so viscous that further processing is difficult; therefore greater than 40 percent of cellulose ester is generally not used.

The preparation of cellulose esters in well known in the art. See ENCYCLOPEDIA OF POLYMER SCIENCE AND TECHNOLOGY, Vol. 3, p.332–342, Interscience Publishers, 1965, for a discussion of the preparation of cellulose esters and cellulose acetate butyrate. Suitable examples of cellulose esters for use in the present invention include cellulose acetate butyrate (CAB), cellulose acetate propionate (CAP), cellulose acetate valerate (CAV), cellulose acetate propionate butyrate (CAPB), and the like, with CAB being preferred. The CAB may have a butyryl content of about 15 to 57 weight percent, preferably from about 25 to 55 weight percent; an acetyl content of about 0 to 34 weight percent, preferably form about 0.5 to 16 weight percent; and an hydroxyl content of about 0.5 to 5 weight percent, preferably from about 0.5 to 3. CAB products with a variety of butyryl, acetyl, and hydroxyl contents are commercially available, for example, from Eastman Chemical Company. Eastman's CAB 551-0.2, and CAB 551-0.01 are preferred because their low softening points. A low softening point of the CAB allows for a lower viscosity of the solution of vinyl monomers and CAB, thereby facilitating particulating the solution into microparticles. It should be understood that cellulose ester includes mixed esters of cellulose such as those listed above, but does not include nitrocelluloses.

Typically the remainder of the resin solids of the aqueous dispersion contains vinyl monomers that are copolymerized in the presence of cellulose ester. Preferably the vinyl monomers are present from about 60 to 95 percent, more preferably from about 70 to 90 percent by weight, based on resin solids of the dispersion. Examples of suitable vinyl monomers include acrylic monomers including alkyl esters of acrylic and methacrylic acid, such as methyl acrylate, methyl methacrylate, butyl acrylate, butyl methacrylate, 2-ethylhexyl acrylate, isobornyl methacrylate, lauryl methacrylate 2-ethylhexyl methacrylate, 2-hydroxyethyl acrylate, 2-hydroxyethyl methacrylate, hydroxypropyl acrylate, hydroxypropyl methacrylate, and the like. Other examples include glycidyl acrylate, glycidyl methacrylate, styrene, alpha-methyl styrene, acrylamide, acrylonitrile, methacrylonitrile, alkyl esters of maleic and fumaric acid, vinyl and vinylidene halides, acrylic acid, methacrylic acid, vinyl acetate, vinyl ethers, and allyl ethers. Also suitable are N-(alkoxymethyl) acrylamide monomer(s) and N-(alkoxymethyl) acrylamide monomer(s) such as N-butoxymethyl acrylamide and N-butoxymethyl methacrylamide. Preferably the vinyl monomers used to prepare the aqueous dispersion are selected from acrylic monomers.

At least one of the vinyl monomers used in the preparation of the invention is polyethylenically unsaturated in order to obtain polymers that are crosslinked. It has been found that coating compositions used as base coats in color-plus-clear systems containing aqueous emulsions of particulated polymers need to have the polymers within the microparticles crosslinked to prevent "soak-in" of the subsequently applied clear coat. If the polymers are not crosslinked, the solvent from a subsequently deposited clear coat may partially dissolve non-crosslinked polymers, thereby allowing metallic flakes in the base coat to move and disorientate themselves. This movement of metallic flakes can produce blotchy areas of light and dark colors, or "mottle," which is undesirable. Another consequence of "soak-in" can be low gloss or sometimes a hazy appearance of the resultant film.

It has been found that using only one polyethylenically unsaturated vinyl monomer by itself to make the polymer in the aqueous dispersion does not produce the desired results. Preferably at least one of the vinyl monomers is polyethylenically unsaturated and at least one vinyl monomer is monofunctional with respect to unsaturation to achieve the desired crosslinked polymer in the microparticles of the aqueous dispersions of this invention. The ratio of polyethylenically unsaturated monomer content to monofunctional vinyl monomer content may range from 1:200 to 9:1. Examples of polyethylenically unsaturated vinyl monomers include butadiene, isoprene, divinyl benzene, ethylene glycol dimethacrylate, ethylene glycol diacrylate, propylene glycol dimethacrylate, propylene glycol diacrylate, allyl methacrylate, allyl acrylate, diacrylate and dimethacrylate esters of $C_2$–$C_6$ diols such as butanediol diacrylate, butanediol dimethacrylate, 1,6-hexanediol diacrylate, and 1,6-hexanediol dimethacrylate, divinyl benzene, divinyl ether, divinyl sulfide, trimethylolpropane triacrylate, and the like. Oligomeric urethane diacrylate or dimethacrylate can also be used.

The aqueous dispersion may also contain surfactant to achieve the requisite dispersion stability. The surfactant can be a material whose role is prevention of emulsified particles agglomerating to form larger particles. Anionic, cationic, and nonionic surfactants are suitable for use in the aqueous dispersion of this invention, with anionic surfactants being preferred. Non-limiting examples of suitable anionic surfactants include the dimethylethanolamine salt of dodecylbenzenesulfonic acid, sodium dioctylsulfosuccinate, salts of ethoxylated nonylphenol sulfate and sodium dodecyl benzene sulfonate. Other materials well known to those skilled in the art, such as surface active soaps, are also suitable herein. The amount of surfactant is typically less than about 10 percent, preferably from about 1 percent to about 5 percent, the percentage based on the total solids of the dispersion. Higher percentages of surfactant, greater than 10 percent, may be detrimental to the humidity resistance of a coating composition containing the aqueous dispersion of this invention; therefore greater than 10 percent is preferably avoided. One particularly useful surfactant for the preparation of the cellulose ester-containing aqueous dispersions of the present invention is the ammonium salt of ethoxylated nonylphenol sulfate commercially available from Rhone-Poulenc Co. as ALIPAL CO-436.

Generally the cellulose ester, vinyl monomers, and surfactant are mixed together with water under agitation at ambient conditions to form a pre-emulsion mixture. At this stage the cellulose ester, vinyl monomers and surfactant have formed a semi-stable emulsion. The pre-emulsion may be stabilized with additional surfactant, but this is not preferred. The pre-emulsion mixture is then subjected to stress in order to particulate it into microparticles which are uniformly of a fine particle size. This dispersion of microparticles can be referred to as a "microdispersion." The pre-emulsion may be provided with appropriate stress by means of a MICROFLUIDIZER® high pressure impingement emulsifier which is available from Microfluidics Corporation in Newton, Mass. The MICROFLUIDIZER® emulsifier is disclosed in U.S. Pat. No. 4,533,254. The device consists of a high pressure pump capable of producing up to 20,000 psi (138,000 kPa) and an interaction chamber where the emulsification takes place. The pump forces the mixture of reactants in aqueous medium into the chamber where it is split into at least two streams which pass at very high velocity through at least two slits and collide resulting in the particulation of the mixture into small particles. Generally, the pre-emulsion mixture passed through the emulsifier once at a pressure between 5,000 and 15,000 psi (34,500 kPa and 103,500 kPa). Multiple passes can result in smaller average particle size and a narrower range for the particle size distribution. When using the aforesaid MICROFLUIDIZER® emulsifier, stress is applied by liquid-liquid impingement as has been described.

Stress is described as force per unit area. Although the precise mechanism by which the MICROFLUIDIZER® emulsifier stresses the pre-emulsification mixture to particulate it is not thoroughly understood, it is theorized that stress is exerted in more than one manner. It is believed that one manner in which stress is exerted is by shear. Shear means that the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by theory, it is believed that both shear and cavitation contribute to producing the stress which particulates the pre-emulsion mixture when using the MICROFLUIDIZER® emulsifier. However, it should be understood that if desired, other modes of applying stress to the pre-emulsification mixture can be utilized so long as sufficient stress is applied to achieve the requisite particle size distribution. For example, one alternative manner of applying stress would be the use of ultrasonic energy which normally applies stress through cavitation.

An important aspect of the polymer microdispersions of the present invention is that the particle size is uniformly small, i.e., after polymerization less than 20 percent of the polymer microparticles have a mean diameter which is greater than 5 microns. More preferably, after polymerization less than 20 percent of the polymer microparticles have a mean diameter which is greater than 1 micron. Generally, the microparticles have a mean diameter from about 0.01 microns to about 10 microns. Preferably the mean diameter of the particles after polymerization ranges from about 0.05 microns to about 0.7 microns. The particle size can be measured with a particle size analyzer such as the Horiba LA900 instrument commercially available from Horiba.

After the pre-emulsion formed by the cellulose ester, vinyl monomers, and surfactant in water has been particulated into microparticles as described above, the vinyl monomers in each microparticle are copolymerized by free radical polymerization in the presence of the cellulose ester also contained in the microparticles. In order to conduct the free radical polymerization of the polymerizable species, a free radical initiator can be employed. Examples of free radical initiators include t-butylhydroperoxide, ammonium peroxydisulfate, potassium peroxydisulfate, hydrogen peroxide, and the salt of 4,4'-isobis(4-syano valeric acid) commercially available from Wako Chemicals, Inc. as V-501. Additionally, redox initiators such as ammonium peroxydisulfate and sodium metabisulfite or t-butylhydroperoxide and isoascorbic acid may be used. Since the addition of certain initiators, such as redox initiators, can result in a strong exothermic reaction, it is generally desirable that those initiators be added to the other ingredients immediately before the reaction is to be conducted.

The particulated dispersion is then subjected to conditions sufficient to induce polymerization of the polymerizable species within the microparticles. The particular conditions will vary depending upon the actual materials being polymerized. The length of time required to complete polymerization typically varies from about 5 minutes to about 6 hours. The progress of the polymerization reaction can be followed by techniques conventionally known to those skilled in the art of polymer chemistry. For example, heat generation, monomer concentration and percent of total solids are all methods of monitoring the progress of the polymerization. If there is still free monomer remaining after all of the initiator is consumed, an additional amount of initiator can be added to scavenge the remaining monomer.

The aqueous microparticle dispersions can be polymerized by a batch process or a continuous process. In one batch process the dispersion of unreacted microparticles is fed over a period of about 1 to 4 hours into a heated reactor initially charged with water. The initiator can be fed in simultaneously or it can be charged to the reactor before feeding in the dispersion of microparticles. The optimum temperature depends upon the specific initiator being used. The length of time typically ranges from about 2 hours to about 6 hours.

In an alternative batch process, a reactor vessel is charged with the entire amount of the dispersion of microparticles, or microdispersion, to be polymerized. Polymerization commences when an appropriate initiator such as a redox initiator is added. An appropriate initial temperature is chosen such that the heat of polymerization does not increase the batch temperature beyond the boiling point of the ingredients. Thus for large scale production, it is preferred that the microdispersion have sufficient heat capacity to absorb the total amount of heat being generated.

In a continuous process the pre-emulsion or mixture of raw materials is passed through the homogenizer to make a microdispersion which is immediately passed through a heated tube, e.g., stainless steel, or a heat exchanger in which polymerization takes place. The initiator is added to the microdispersion just before it enters the tube.

Once the polymerization is complete, the resultant product is a stable dispersion of polymer microparticles in an aqueous medium. By "stably dispersed" is meant that the polymer microparticles do not settle upon standing and do not coagulate or flocculate on standing. Typically, the microparticle dispersions do not settle significantly when aged for one month at room temperature.

The stable, cellulose ester-containing, aqueous dispersions can be formulated into aqueous coating compositions. Generally the aqueous compositions may contain from about 20 to 80 percent by weight of resin solids of the cellulose ester containing aqueous dispersion of this invention. When used in amounts less than 20 weight percent, the aqueous coating compositions do not exhibit the significant improvement in low temperature bake repair adhesion properties.

In a preferred embodiment, the coating compositions contain a crosslinking agent which is adapted to cure the coating composition, such as an aminoplast crosslinker. The crosslinking material can be present in an amount of about 0 to 50 percent by weight of resin solids. Aminoplast resins are based on the addition products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted melamines. Some examples of such compounds are N,N'-dimethyl urea, benzourea, dicyandiamide, formaguanamine, acetoguanamine, glycoluril, anneline, 2-chloro-4,6-diamino-1,3,5-triazine, and the like. While the aldehyde employed is most often formaldehyde, other similar condensation products can be made from other aldehydes, such as acetaldehyde, crotonaldehyde, acrolein, benzaldehyde, furfuryl, glyoxal and the like. The aminoplast resins contain methylol or similar alkylol groups, and in most instances, at least a portion of these alkylol groups are etherified by a reaction with an alcohol to provide organic solvent soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as CELLOSOLVE® and CARBITOL® solvents, and halogen substituted or other substituted alcohols, such as 3-chloropropanol or butoxyethanol.

The claimed coating compositions can contain, in addition to the components described above, a variety of other optional materials. As was mentioned above, if desired, other resinous film forming materials can be utilized in conjunction with the dispersion of polymeric microparticles so long as the resultant coating composition is not detrimentally affected in terms of physical performance and properties. The resinous film forming materials can include for example acrylic, polyester, polyether, and polyurethane materials or a mixture thereof. In addition, material such as rheology control agents, ultraviolet light stabilizers, catalysts, fillers and the like can be present.

The aqueous coating compositions of the present invention are particularly suitable as base coating compositions in automotive color plus clear applications. For this application pigment is one of the principal ingredients. The pigments which can be utilized are of various types. When a metallic coating is desired preferably aluminum flake is utilized. A variety of grades of aluminum flake are available such as Sparkle Silver 5000 AR from Silberline, 8260 from Toyo Aluminum K. K. and OBT 8167 STAPA M from Obron Atlantic Corporation. Also chrome treated aluminum flake such as Hydrolux 400 and Hydrolux 500 from Oberon Atlantic Corporation can be used. Other metallic pigments include bronze flakes, coated mica, nickel flakes, tin flakes, silver flakes, copper flakes, or combination of these. Other examples of suitable pigments include mica, iron oxides, lead oxides, carbon black, titanium dioxide, talc, as well as a variety of color pigments. The specific pigment to binder ratio can vary widely so long as it provides the requisite hiding at the desired film thickness and application solids.

The claimed coating compositions can be applied by conventional means including brushing, dipping, flow coating, spraying and the like, but they are most often applied by spraying. Conventionally known spray techniques and equipment for air spraying and electrostatic spraying and either manual or automatic methods can be used.

During application of the base coat composition to the substrate, a film of the base coat is formed on the substrate. Typically, the base coat thickness will be about 0.01 to 5 mils (0.25 to 127μ), preferably 0.1 to 2 mils (2.5 to 51μ) in thickness.

After application to the substrate of the base coat composition, a film is formed on the surface of the substrate. This is achieved by driving volitiles, i.e., organic solvent and water, out of the base coat film by heating or simply by an air-drying period. Preferably, the heating step will be for a period to insure that the top coat composition can be applied to the base coat without the former dissolving the base coat composition, i.e., "striking in". Suitable drying conditions will depend on the particular base coat composition, and on the ambient humidity with certain waterbased compositions, but in general a drying time of from about 1 to 5 minutes at a temperature of about 100° to 250° F. (38° to 121° C.) will be adequate to insure that mixing of the two coats is minimized. At the same time, the base coat film is adequately wetted by the top coat composition so that satisfactory intercoat adhesion is obtained. Also, more than one base and multiple top coats may be applied to develop the optimum appearance. Usually between coats, the previously applied base coat or top coat is flashed, that is, exposed to ambient conditions for about 1 to 20 minutes. The clear top coat composition can be applied to the basecoated substrate by any of the conventional coating techniques described above in connection with the base coat, but it is preferred that spray applications be used since this gives the best gloss. The thickness of the topcoat is usually from about 0.5 to 5 mils (13 to 127μ), preferably 1.2 to 3 mils (31 to 76μ).

After application of the top coat composition to the base coat, the coated substrate is heated to cure the coating layers. In the curing operation, the film-forming material of the top coat and/or of the base coat is crosslinked with the aid of any crosslinking agents present. The heating or curing operation is usually carried out at a temperature in the range of from 160° to 350° F. (71° to 177° C.) but if needed lower or higher temperatures may be used depending upon whether it is sufficient to activate any necessary crosslinking mechanisms.

It should be understood that for the purposes of the present invention the term "curing" also includes drying without any externally added crosslinking agent.

The invention will be further described by reference to the following examples which are presented for the purpose of illustration only and are not intended to limit the scope of the invention.

EXAMPLE A

Preparation of a Cellulose Acetate Butyrate/Acrylic Dispersion of the Present Invention A pre-emulsion of cellulose acetate butyrate and acrylic monomer mixture was prepared as follows:

Cellulose acetate butyrate, CAB 551-0.2 (53% butyryl, 2% acetyl, 1.6% hydroxyl content by weight, 130° C. softening point), available from Eastman Chemical Co., 157.8 grams, was dissolved in 192.6 grams of methyl methacrylate and 385.4 grams of n-butyl acrylate while stirring at room temperature in a flask. The remaining acrylic monomers (22.0 grams of 2-hydroxyethyl methacrylate, 19.0 grams of ethylene glycol dimethacrylate and 12.6 grams of acrylic acid) were added and the mixture was agitated for 10 minutes before adding 14.8 grams of ALIPAL CO-436 (ammonium salt of ethoxylated nonylphenol sulfate (58% active) available from Rhone-Poulenc, USA). After mixing for 5 minutes, 1000.0 grams of deionized water and 3 drops of FOAMKILL 649 (aliphatic hydrocarbon available from Crucible Chemical, USA) were added and stirred for about 5 minutes for pre-emulsification.

The pre-emulsion was passed once through a M110T MICROFLUIDIZER® emulsifier, commercially available from Microfluidics Corporation, at 8000 psi (55,158 kPa) to produce a microdispersion. The microdispersion was stirred at room temperature in a round bottom flask. After 1.34 grams of 1 percent aqueous solution of ferrous ammonium sulfate was added the mixture was heated to 40° C. under nitrogen. A solution of 2.6 grams of isoascorbic acid in 26.6 grams of deionized water was added very fast and followed by the addition of the following solution over 10 minutes:

| Ingredients | Grams |
| --- | --- |
| ALIPAL CO-436 | 7.4 |
| Deionized water | 154.6 |
| Tert-butylhydroperoxide (70 percent active in water) | 3.6 |

The temperature rose spontaneously to 86° C. The product was filtered to yield a dispersion with a resin content of 38.4 percent by weight, determined at 110° C. for one hour, and a pH of 3.60. The pH of the latex was adjusted to 8.21 using N, N-dimethylethanolamine as a neutralizing agent.

EXAMPLE B (COMPARATIVE)

Preparation of an Acrylic Latex

The following initial charge and feeds were used to prepare an acrylic latex without cellulose acetate butyrate and without the use of a MICROFLUIDIZER ® emulsifier.

| Ingredients | Grams |
| --- | --- |
| Initial Charge | |
| Deionized water | 450.0 |
| ALIPAL CO-436 | 6.0 |
| Feed 1 (Pre-emulsified) | |
| n-Butyl acrylate | 377.2 |
| Methyl methacrylate | 188.8 |
| Ethylene glycol dimethacrylate | 18.9 |
| 2-Hydroxyethyl methacrylate | 21.7 |
| Acrylic acid | 12.4 |
| ALIPAL CO-436 | 13.3 |
| Deionized water | 250.0 |
| Feed 2 | |
| Deionized water | 150.0 |
| Isoascorbic acid | 2.6 |

-continued

| Ingredients | Grams |
| --- | --- |
| Feed 3 | |
| Deionized water | 150.0 |
| ALIPAL CO-436 | 2.0 |
| Tert-butylhydroperoxide | 2.52 |

The initial charge was heated to a temperature of 85° C. with agitation in a reaction vessel suitable for emulsion polymerization. Ten percent by weight of Feed 1, 2, and 3 were added to the reaction vessel and the reaction mixture was held about 30 minutes at this temperature. Then the remaining portions of Feed 1, 2, and 3 were added to the reaction mixture simultaneously over a 3-hour period while maintaining the reaction mixture temperature at about 85° C. At the completion of the additions, the reaction mixture was held for 2 hours at 85° C. to complete the polymerization. The product was filtered to yield a latex with a resin content of 38.2 percent by weight, determined at 110° C. for one hour and a pH of 3.88. The pH was adjusted to 8.25 using 10.7 grams of N,N-dimethylethanol amine.

EXAMPLE C (COMPARATIVE)

Preparation of a Cellulose Acetate Butyrate Dispersion

The following initial charge and feeds were used to prepare an aqueous dispersion of cellulose acetate butyrate. The dispersion was blended with the acrylic latex of Example B to form a coating composition containing both acrylic resin and cellulose acetate butyrate (Example II, described below) that was used as a comparison to a coating composition prepared according to the present invention (Example I described below).

| Ingredients | Grams |
| --- | --- |
| Initial Charge | |
| Cellulose acetate butyrate, CAB 551–0.2 | 500.0 |
| Methylisobutyl ketone | 2000.0 |
| Feed 1 | |
| ALIPAL CO-436 | 43.0 |
| Feed 2 | |
| Deionized water | 2625.0 |

The initial charge was mixed in a suitable reaction vessel at room temperature to dissolve cellulose acetate butyrate in methylisobutyl ketone. Feed 1 was added to the reaction vessel and held about 5 minutes under agitation for mixing, followed by the addition of Feed 2. After about 15 minutes of agitation at room temperature, the resulted mixture was passed once through a M110T MICROFLUIDIZER® emulsifier at 8000 psi to produce a microdispersion. The microdispersion was heated for azeotropic distillation of methylisobutyl ketone. The distillation was stopped after collecting about 2165 grams of distillate. The product was filtered to yield a dispersion with a solids content of 18.1 percent by weight determined at 110° C. for 1 hour.

EXAMPLE D

Preparation of a Cellulose Acetate Butyrate/Acrylic Dispersion of the Present Invention This example utilizes a CAB with a lower softening point than the CAB utilized in Example A. A pre-emulsion of cellulose acetate butyrate and acrylic monomer mixture was prepared as follows:

Cellulose acetate butyrate, CAB 551-0.01 (53% butyryl, 2% Acetyl, 1.6% Hydroxyl content by weight, 110° C. softening point), available from Eastman Chemical Co., 158.0 grams, was dissolved in 577.8 grams of n-butyl acrylate by stirring at room temperature. The remaining acrylic monomers (22.1 grams of 2-hydroxyethyl methacrylate, 18.9 grams of ethylene glycol dimethacrylate and 12.6 grams of acrylic acid) were added and the mixture was agitated for about 20 minutes before adding 14.8 grams of ALIPAL CO-436. After mixing for 10 minutes, 1000.0 grams of deionized water and 3 drops of FOAMKILL 649 were added and stirred for about 5 minutes for pre-emulsification.

The pre-emulsion was passed once through a M110T Microfluidizer® emulsifier at 8000 psi to produce a microdispersion. The microdispersion was stirred at room temperature in a round bottom flask. After a mixture of 1.34 grams of 1 percent aqueous solution of ferrous ammonium sulfate and 16.6 grams of deionized water was added the mixture was heated to 40° C. under nitrogen. The solution of 2.6 grams of isoascorbic acid in 33.4 grams of deionized water was added very fast and followed by the addition of the following solution over 10 minutes:

| Ingredients | Grams |
| --- | --- |
| ALIPAL CO-436 | 7.4 |
| Deionized water | 154.6 |
| Tert-butylhydroperoxide | 3.6 |

The temperature rose spontaneously to 92° C. The product was filtered to yield a latex with a resin content of 38.9 percent determined at 110° C. for one hour and a pH of 2.79. The pH of the latex was adjusted to 8.33 using 11.0 grams of N,N-dimethylethanolamine as a neutralizing agent.

EXAMPLE E

Preparation of a Polyurethane Dispersion

Although not required by the present invention, a preferred coating composition, described below in Example IV, embodying the present invention contained, for the sake of additional property enhancements, an additive component comprising a polyurethane dispersion, the preparation of which is described in this example. This material is the subject matter of co-pending, commonly owned U.S. patent application Ser. No. 08/668,069 filed Jun. 24, 1996, U.S. Pat. No. 5,739,194 titled "Humidity Resistant Aqueous Urethane/Acrylic Resins and Coating Compositions" by Anbazhagan Natesh et al.

A polyurethane dispersion, to be included as part of a coating composition of the present invention described below in Example IV, was prepared as follows:

| Feed | Ingredient | Parts by weight |
| --- | --- | --- |
| 1. | Methylene dicyclohexyl diisocyanate | 183.5 |
| 2. | DDI 1410 diisocyanate[1] | 106.5 |
| 3. | FORMREZ® 66–56[2] | 295.0 |
| 4. | Dibutyltin dilaurate | 0.5 |
| 5. | Dimethylol propionic acid | 45.6 |

-continued

| Feed | Ingredient | Parts by weight |
| --- | --- | --- |
| 6. | Methyl ethyl ketone | 143.6 |
| 7. | Methyl methacrylate | 246.0 |
| 8. | Butyl acrylate | 188.7 |
| 9. | Dimethylethanol amine | 30.3 |
| 10. | Ethylene diamine | 21.3 |
| 11. | Deionized water | 1625.0 |
| 12. | Ferrous ammonium sulfate (1% aqueous solution) | 1.5 |
| 13. | Isoascorbic acid | 1.0 |
| 14. | Hydrogen peroxide (35% aqueous solution) | 1.5 |
| 15. | Deionized water | 87.5 |

Into a clean dry reactor equipped with heating, cooling, stirring and a nitrogen blanket were charged feeds 1 to 6. The reaction mixture was heated to 70° C. and held at this temperature for 2 hours. After this hold, feeds 7, 8, and 9 were added to the reaction product while cooling the reactor to 35° C. The prepolymer/monomer mixture was then transferred into another reactor containing feeds 10 and 11. The resulting dispersion was heated to 40° C., followed by the addition of feeds 12, 13, 14, and 15. The solution exothermed to about 60° C. The product thus formed had the following physical properties: total solids of about 35%, pH of about 8.1, viscosity of about 100 centipoise.

EXAMPLE F

Preparation of a Cellulose Acetate Butyrate/acrylic Dispersion of the Present Invention The dispersion of this invention was used in the coating composition of Example V as a comparison to the coating composition of Example VI containing the dispersion of comparative Example G. A pre-emulsion of cellulose acetate butyrate and acrylic monomer mixture was prepared as follows:

Cellulose acetate butyrate, CAB 551-0.2, 73.0 grams, was dissolved in 125.6 grams of methyl methacrylate and 125.6 grams of n-butyl acrylate by stirring at room temperature. The remaining acrylic monomers (29.2 grams of 2-hydroxyethyl methacrylate, 5.8 grams of ethylene glycol dimethacrylate and 5.8 grams of acrylic acid) were added and the mixture was agitated for about 20 minutes before adding 21.0 grams of ALIPAL CO-436. After mixing for 10 minutes, 380.0 grams of deionized water was added and stirred for about 5 minutes for pre-emulsification.

The pre-emulsion was passed once through a M110 T Microfluidizer® emulsifier at 8000 psi to produce a microdispersion. The polymerization of the aqueous microdispersion was as follows:

In a suitable reaction vessel 100.0 grams of deionized water was heated to 80° C. Five percent by weight of the aqueous microdispersion, ten percent by weight of a solution of 2.9 grams of isoascorbic acid in 100.0 grams of water and ten percent by weight of a solution of 4.2 grams of isoascorbic acid and 4.2 grams of ALIPAL CO-436 in 100.0 grams of water were added into the reaction vessel and the reaction mixture was held 15 minutes at 80° C. The remainder of the aqueous microdispersion was added over 3 hours and the remainder of the other two aqueous solutions containing isoascorbic acid and tert-butylhydroperoxide were added over 4 hours, simultaneously. After the completion of additions the reaction mixture was held for 2 hours at 80° C. The reaction mixture was cooled and filtered to yield a dispersion with a resin content of 32.9 percent by weight, determined at 110° C. for one hour. The pH of the dispersion was adjusted to 8.1 using N,N-dimethylethanol amine.

EXAMPLE G (COMPARATIVE)

Preparation of Cellulose Acetate Butyrate/Acrylic Dispersion that does not Contain at Least One Polyethylenically Unsaturated Monomer A dispersion was prepared using the similar procedure in Example F except the ethylenically unsaturated monomer (ethylene glycol dimethacrylate) was replaced with an equivalent amount of methyl methacrylate. The dispersion had a resin content of 33.1 percent by weight, determined at 110° C. for one hour. The pH of the dispersion was adjusted to 8.1 using N,N-dimethylethanol amine.

EXAMPLE I

An aqueous coating composition, containing a cellulose acetate butyrate/acrylic dispersion of the present invention, was prepared in the following manner.

An aluminum pigment paste was prepared by mixing together in a suitable container the following materials:

| Ingredients | Grams |
| --- | --- |
| Ethylene glycol monohexyl ether[1] | 18.3 |
| Diethylene glycol monobutyl ether[2] | 8.5 |
| Polypropylene glycol[3] | 12.0 |
| TINUVIN 1130[4] | 3.0 |
| Phosphatized epoxy[5] | 29.2 |
| Aluminum pigment[6] | 0.9 |
| CYMEL 327[7] | 22.9 |
| Oligomeric ester[8] | 6.2 |
| Dimethylethanolamine | 1.5 |

[1]Commercially available from Union Carbide Chemicals and Plastics Co., Inc. as Hexyl CELLOSOLVE.
[2]Commercially available from Union Carbide Chemicals and Plastics Co., Inc. as Butyl CARBITOL.
[3]Molecular weight of 425, commercially available from ARCO Chemicals Co.
[4]Substituted hydroxyphenyl benzotriazole UV light stabilizer available from Ciba-Geigy Corp.
[5]Reaction product of 83 parts EPON 828 (diglycidyl ether of bisphenol A available from Shell Oil and Chemical Co.) and 17 parts phosphoric acid at 55 percent weight solids.
[6]Chromium treated aluminum pigment at 65% solids in 15% water, 5% ethylene glycol monobutyl ether, 5% naphtha, and 10% mineral spirits, available from Obron Atlantic Corporation under the trademark Stapa Hydrolux 400.
[7]Highly methylated, high imino content melamine formaldehyde resin in isobutanol available from CYTEC Technology Company.
[8]A polyacid half-ester of 1-(3-hydroxy-2,2-dimethylpropyl)3-hydroxy-2,2-dimethylpropionate ESTER DIOL 204) and methylhexahydrophthalic anhydride prepared according to U.S. Pat. No. 4,927,868, Example B.

The coating composition was prepared by combining together under agitation in a suitable container the aluminum pigment paste and the following premixed ingredients:

| Ingredients | Grams |
| --- | --- |
| Acrylic polymer[1] | 38.5 |
| Dispersion from Example A | 138.0 |
| Mineral spirits[2] | 7.1 |

[1]35% butyl acrylate, 30% styrene, 18% butyl methacrylate, 8.5% 2-hydroxyethyl acrylate, 8.5% acrylic acid; at 27% total solids dispersed in a mixture of deionized water and diethylene glycol monobutyl ether.
[2]Mineral spirits available from Shell Oil and Chemical Co. as SHELL SOL 71.

The coating composition had a solids content of 30.1 percent by weight and was adjusted to a pH of 8.5 with 6.2 grams of a 50 percent solution of dimethylethanolamine in deionized water, and to a spray viscosity of 24 seconds #4 Ford Cup with 116.1 grams of deionized water.

EXAMPLE II (COMPARATIVE)

An aqueous coating composition, containing a blend of a cellulose acetate butyrate dispersion and an acrylic dispersion, was prepared in the following manner. The aluminum pigment paste of Example I was mixed under agitation in a suitable container with the following premixed ingredients:

| Ingredients | Grams |
| --- | --- |
| Acrylic polymer[1] | 38.5 |
| Acrylic latex from Example B | 111.0 |
| CAB dispersion of Example C | 58.6 |
| Mineral spirits | 7.1 |

[1]35% butyl acrylate, 30% styrene, 18% butyl methacrylate, 8.5% 2-hydroxyethyl acrylate, 8.5% acrylic acid; at 27% total solids dispersed in a mixture of deionized water and diethylene glycol monobutyl ether.

The coating composition had a solids content of 28.5 percent by weight and was adjusted to a pH of 8.5 with 4.9 grams of a 50 percent solution of dimethylethanolamine in deionized water, and to a spray viscosity of 24 seconds #4 Ford Cup with 107.9 grams of deionized water.

EXAMPLE III

The pigmented aqueous coating compositions of Example I, and II were evaluated for use as a base coat compositions on cold rolled steel test panels treated with BONDERITE 40, commercially available from ACT Company, and electrocoated with cationic electrocoat primer commercially available from PPG, Industries, Inc. as ED 5000.

The base coats were spray applied to the test panels with the spray booth at 60 percent relative humidity then baked for 5 minutes at 200° F. (93° C.). A solventborne clear coat composition commercially available from PPG Industries, Inc. as DCT 5002 was then spray applied onto the basecoated test panels and baked for 30 minutes at 285° F. (140° C.). The resultant dry film thickness of the base coat was 0.5 to 0.7 mils (13 to 18$\mu$), and of the clear coat was about 2.0 mils (51$\mu$).

To evaluate the base coats for low bake repair properties, the base coat was spray applied onto test panels that had been base coat-clearcoated, as described above, without sanding or prepping the original coated panel, at 60 percent humidity and baked for 10 minutes at 176° F. (80° C.). A solventborne two component isocyanate clear coat composition commercially available from PPG Industries, Inc. as DCU 2001 was then spray applied on to the repair basecoated test panels, and baked for 40 minutes at 185° F. (85° C.).

The cured base coats were then evaluated for gloss, distinctness of image (DOI) and cross-hatch adhesion both initially after cure and after 96 hours of condensing humidity at 140° F. (60° C.) or 200 hours of condensing humidity at 104° F. (40° C.) in a QCT condensing humidity cabinet commercially available from Q Panel Company, Cleveland, Ohio.

Gloss was measure at a 20° angle with a Glossmeter commercially available from Hunter Laboratory, Inc. DOI was measured with a Dorigon DOI meter commercially available from Hunter Laboratory, Inc. Cross hatch adhesion was measured in accordance with the method set forth in ASTM D3359, Method B, whereby the coating was scribed with eleven parallel cuts through the film 2 millimeter apart, using a Gardner Cross Cut Tester Model P-A-T, fitted with a PA-2056 blade (both available from Gardco, Pompano Beach, Fla.). Eleven similar cuts were made at 90 degrees to and crossing the first eleven cuts. Permacel 99 tape was applied over the area of cuts by pressing down firmly against the coating to eliminate voids and air pockets. Then the tape was sharply pulled off at a 180 degree angle to the plane of the coated surface. A rating of 0 indicated the test was failed with complete adhesion loss, and a rating of 5 indicated no loss of adhesion, with values between these two endpoints being indicative of degree of adhesion loss.

Table I lists the test results for the normal bake and Table II lists the results for the low bake repair tests. The results demonstrate that the coating composition of the claimed invention (Example I) had excellent humidity resistance for normal bake and low bake repair conditions. Additionally, a blend of the individual components of the CAB/acrylic latex as in the coating of Example II was not sufficient to achieve the desired appearance and humidity resistance.

TABLE I

|  | Gloss | DOI | Crosshatch Adhesion | Blistering | Appearance* |
|---|---|---|---|---|---|
| Example I |  |  |  |  |  |
| Initial | 86 | 74 | 5 | — | Acceptable |
| 96 Hr/60° C. | 82 | 36 | 5 | Very Slight | Acceptable |
| Example II (Comparative) |  |  |  |  |  |
| Initial | 81 | 46 | 5 | — | Poor |
| 96 Hr/60° C. | 18 | 0 | 2 | Very Bad | Poor |

*Appearance was evaluated for metallic pigment orientation of the base coat by visual inspection and rated Excellent, Acceptable, or Poor.

TABLE II

LOW BAKE REPAIR

|  | Gloss | DOI | Crosshatch Adhesion |
|---|---|---|---|
| Example I |  |  |  |
| Initial | 90 | 81 | 5 |
| 200 Hr/40° C. | 83 | 38 | 5 |
| Example II (Comparative) |  |  |  |
| Initial | 88 | 66 | 5 |
| 200 Hr/40° C. | 42 | 4 | 2 |

EXAMPLE IV

A black mica containing aqueous coating composition of the present invention was prepared from the cellulose acetate butyrate/acrylic dispersion of Example D in the following manner. The coating composition included an additional film forming resinous material, the polyurethane dispersion of Example E.

A blue pigment paste was prepared by mixing together the following materials under suitable agitation in a suitable container, then grinding the pigment mixture in a horizontal mill.

| Ingredients | Grams |
|---|---|
| 1-Methoxy-2-propanol | 66.85 |
| Deionized water | 144.08 |
| Acrylic polymer[1] | 374.60 |
| Polyol[2] | 35.73 |
| Dimethylethanolamine, 50% in deionized water | 8.64 |
| Heliogen Blue pigment[3] | 97.40 |
| Add the following pre-mix to above ingredients |  |
| Polyurethane-acrylic latex[4] | 39.09 |
| Deionized water | 107.07 |

[1]35% butyl acrylate, 30% styrene, 18% butyl methacrylate, 8.5% 2-hydroxyethyl acrylate, 8.5% acrylic acid; at 27% total solids dispersed in a mixture of deionized water and diethylene glycol monobutyl ether.
[2]Polypropylene glycol, commercially available from Union Carbide Chemicals and Plastic Co., Inc. as PPG-425.
[3]Commercially available from BASF Corporation.
[4]Prepared according to U.S. Pat. No. 5,071,904, Example I.

A red pigment paste was prepared by mixing together the following materials under suitable agitation in a suitable container, then grinding the pigment mixture in a horizontal mill.

| Ingredients | Grams |
|---|---|
| 1-Methoxy-2-propanol | 15.52 |
| Deionized water | 38.80 |
| Acrylic polymer[1] | 408.87 |
| Polyol[2] | 29.67 |
| Dimethylethanolamine, 50% in deionized water | 5.71 |
| Red pigment[3] | 78.04 |
| Deionized water | 29.72 |

[1]35% butyl acrylate, 30% styrene, 18% butyl methacrylate, 8.5% 2-hydroxyethyl acrylate, 8.5% acrylic acid; at 27% total solids dispersed in a mixture of deionized water and diethylene glycol monobutyl ether.
[2]Polypropylene glycol commercially available from Union Carbide Chemicals and Plastics Co., Inc. as PPG-425.
[3]Commercially available from Ciba-Geigy Corp. as Y RT-759-D.

A black pigment paste was prepared by mixing together the following materials under suitable agitation in a suitable container, then grinding the pigment mixture in a horizontal mill.

| Ingredients | Grams |
|---|---|
| 1-Methoxy-2-propanol | 52.76 |
| n-Propoxy propanol | 52.76 |
| Deionized water | 97.66 |
| Acrylic polymer[1] | 585.89 |
| Dimethylethanolamine, 50% in deionized water | 13.30 |
| Carbon black pigment[2] | 54.05 |

[1]35% butyl acrylate, 30% styrene, 18% butyl methacrylate, 8.5% 2-hydroxyethyl acrylate, 8.5% acrylic acid; at 27% total solids dispersed in a mixture of deionized water and diethylene glycol monobutyl ether.
[2]Commercially available from Cabot Corporation as Monarch 1300.

A black mica and aluminum pigment paste was prepared by mixing together the following materials under suitable agitation in a suitable container, then grinding the pigment mixture in a horizontal mill.

| Ingredients | Grams |
| --- | --- |
| Ethyhene glycol monohexyl ether | 13.9 |
| N-methyl pyrollidone | 13.9 |
| TINUVIN 1130 | 5.8 |
| Mica pigment[1] | 4.4 |
| CYMEL 385[2] | 12.4 |
| RESIMENE 750[3] | 12.4 |
| Aluminum pigment[4] | 0.83 |
| Phosphatized epoxy[5] | 0.73 |
| Blue pigment paste, described above | 6.5 |
| Red pigment paste, described above | 11.6 |
| Dimethylethanolamine, 50% in deionized water | 17.5 |
| Deionized water | 112.3 |
| Mineral spirits | 16.0 |
| Oligomeric ester[6] | 24.7 |

[1]Commercially available from The Mearle Corp. as 9225 EWT-1
[2]Melamine formaldehyde resin commercially available from CYTEC Technology Company.
[3]Melamine formaldehyde resin commercially available from Monsanto Chemical Co.
[4]Chromium treated aluminum pigment at 65% solids in 15% water, 5% ethylene glycol monobutyl ether, 5% naphtha, and 10% mineral spirits, available from Obron Atlantic Corporation under the trademark Stapa Hydrolux 400.
[5]Reaction product of 83 parts EPON 828 (diglycidyl ether of bisphenol A available from Shell Oil and Chemical Co.) and 17 parts phosphoric acid at 55 percent weight solids.
[6]A polyacid half-ester of 1-(3-hydroxy-2,2-dimethylpropyl)3-hydroxy-2,2-dimethylpropionate ESTER DIOL 204) and methylhexahydrophthalic anhydride prepared according to U.S. Pat. No. 4,927,868, Example B.

The coating composition was prepared by combining together under agitation in a suitable container the aluminum and mica pigment paste and the following premixed ingredients:

| Ingredients | Grams |
| --- | --- |
| Black pigment paste, described above | 65.9 |
| Dispersion from Example D | 180.1 |
| Polyurethane dispersion from Example E | 201.3 |

The coating composition had a solids content of 21 percent by weight and a pH of 8.8, and was adjusted to a spray viscosity of 24 seconds #4 Ford Cup with deionized water.

The pigmented aqueous coating composition was evaluated for use as a base coat composition on cold rolled steel test panels treated with BONDERITE 40, commercially available from ACT Company, and electrocoated with cationic electrocoat primer commercially available from PPG, Industries, Inc. as ED 5000.

The base coats were spray applied to the test panels with the spray booth at 60 percent relative humidity then baked for 10 minutes at 180° F. (82° C.). A solventborne two component isocyanate clear coat composition commercially available from BASF Corporation was then spray applied onto the basecoated test panels and baked for 30 minutes at 293° F. (145° C.). The resultant dry film thickness of the base coat was 0.5 to 0.7 mils (13 to 18 µg), and of the clear coat was about 1.6 to 1.8 mils (41 to 46µ).

The cured films were evaluated for multi-chip and mono-chip resistance. Also crosshatch adhesion and blistering were evaluated before and after exposure of 240 hours of condensing humidity at 40° C. The results are listed in Table III.

MULTI-CHIP TEST

The test panels were chipped by clamping a test panel in an Erichsen 508 Gravelometer and subjecting the test panel to 500 grams of 0.5 cm split steel shot at 28 psi (2 bar) nozzle pressure. The test panel was subjected to the 500 grams of shot a second time and then removed from the machine. Next the panels were tape tested by covering the impact zone of the panel with Tesa 4651 tape from Beiersdorf AG, Hamburg, Germany, and then removing the tape from the test panel in one rapid pull. The panel was then rated for the amount of paint loss from the impact zone of the panel. The rating scale is 0 to 5, with 0 representing no loss of paint adhesion and 5 representing complete loss of paint adhesion from the impact zone.

MONO-CHIP TEST

The test panels were chipped with the use of a Byk-Gardner Mono-chip Tester. This machine uses an air driven piston to impact the test panel with a small steel mallet shaped like a screw-driver head. The pressure used was 43 psi (3 bar). Three impacts were run at ambient conditions, then the test panel was placed in a freezer at −30° C. and allowed to equilibrate. Within one minute after removing the test panel from the freezer, the panel was impacted three more times in the Byk-Gardner Mono-chip Tester. The impact areas are then tape tested with Tesa 4651 tape. The rating is the average width of paint loss from the impact areas measured in millimeters.

TABLE III

| Initial Adhesion* | Post-humidity Adhesion* | Post-humidity Blistering | Multi-chip Rating | Mono-chip Rating |
| --- | --- | --- | --- | --- |
| 5 | 5 | none | 2.0 | 1.5 |

*Adhesion was measured according to ASTM D3359, with a rating basis of 0 to 5, with 0 representing complete loss of paint adhesion and 5 representing no loss of paint adhesion.

The results demonstrate that the coating composition of the claimed invention in this example has excellent adhesion and chip resistance properties as well as good humidity resistance properties.

EXAMPLES V AND VI

Examples V and VI show a comparison of a coating composition formulated with a cellulose acetate butyrate containing dispersion of this invention (Example V) and a coating composition formulated with a cellulose acetate butyrate dispersion that does not contain a crosslinked polymer in the microparticle of the dispersion (Example VI). Examples V and VI were prepared by mixing together the following ingredients in the order listed.

| Ingredients | Example V Grams | Example VI Grams |
| --- | --- | --- |
| Ethyleneglycol monobutyl ether | 44.4 | 44.4 |
| Diethyleneglycol monobutyl ether | 14.2 | 14.2 |
| n-Propoxypropanol | 6.8 | 6.8 |
| Poly(propylene glycol)[1] | 24.0 | 24.0 |
| Tinuvin 1130 | 6.0 | 6.0 |
| Phosphatized epoxy[2] | 2.2 | 2.2 |
| Aluminum pigment[3] | 58.8 | 58.8 |
| CYMEL 327 | 89.8 | 89.9 |
| Deionized Water | 60.0 | 60.0 |
| Dimethyl ethanolamine, 50% in deionized water | 4.0 | 4.0 |

-continued

| Ingredients | Example V Grams | Example VI Grams |
|---|---|---|
| Mineral Spirits | 12.0 | 12.0 |
| Dispersion from Example F | 322.2 | — |
| Dispersion from Example G | — | 312.6 |

[1] Molecular weight 425, commercially available from ARCO Chemicals Co.
[2] Reaction product of 83 parts EPON 828 (diglycidyl ether of bisphenol A available from Shell Oil and Chemical Co.) and 17 parts phosphoric acid at 55 percent weight solids.
[3] Chromium treated aluminum pigment at 65% solids in 15% water, 5% ethylene glycol monobutyl ether, 5% naphtha, and 10% mineral spirits, available from Obron Atlantic Corporation under the trademark Stapa Hydrolux 400.

The coating composition of Example V had a solids content of 38.1 percent by weight and was adjusted to a pH of 8.7 with 4 grams of a 50 percent solution of dimethylethanolamine in deionized water, and to a spray viscosity of 24 seconds #4 Ford Cup with 315 grams of deionized water.

The coating composition of Example VI was too viscous to spray due to the swelling of the polymer. In addition the dispersion of aluminum pigment in the coating composition was not acceptable. Overall, the composition of Example VI was not usable as a coating.

What is claimed is:

1. A stable aqueous dispersion comprising polymeric microparticles that are curable with a crosslinking agent and heat and that are comprised of cellulose ester other than nitrocellulose, a polymer formed from at least two different vinyl monomers of which at least one vinyl monomer is polyethylenically unsaturated, and surfactant, wherein the dispersion of microparticles is the product of a high stress dispersion followed by polymerization of the vinyl monomers to form the polymer in the presence of the cellulose ester within the microparticles.

2. The stable aqueous dispersion of claim 1 which contains from about 5 to 40 weight percent of cellulose ester, the percentage based on resin solids of the dispersion.

3. The stable aqueous dispersion of claim 1 which contains from about 10 to 30 weight percent of cellulose ester, the percentage based on resin solids of the dispersion.

4. The stable aqueous dispersion of claim 1 wherein the cellulose ester is cellulose acetate butyrate.

5. The stable aqueous dispersion of claim 1 wherein the vinyl monomers are present in an amount of about 60 to 95 weight percent of resin solids of the dispersion.

6. The stable aqueous dispersion of claim 1 wherein the vinyl monomers are present in an amount of about 70 to 90 weight percent of resin solids of the dispersion.

7. The stable aqueous dispersion of claim 1 wherein the polymeric content of the microparticles consists essentially of cellulose ester and the vinyl monomers.

8. The stable aqueous dispersion of claim 1 wherein the polyethylenically unsaturated vinyl monomers are selected from the group consisting of ethylene glycol dimethacrylate, ethylene glycol diacrylate, propylene glycol dimethacrylate, propylene glycol diacrylate, 1,4-butane diol dimethacrylate, 1,4-butane diol diacrylate, allyl methacrylate, allyl acrylate 1,6-hexanediol dimethacrylate, 1,6-hexanediol diacrylate, and divinyl benzene.

9. The stable aqueous dispersion of claim 1 wherein less than 20 percent of the microparticles of the dispersion have a mean diameter particle size of greater than 5 microns.

10. The stable aqueous dispersion of claim 1 wherein less than 20 percent of the microparticles of the dispersion have a mean diameter particle size of greater than 1 micron.

11. The stable aqueous dispersion of claim 1 wherein the polymeric microparticles are crosslinked.

12. An aqueous coating composition comprising:

A. a stable aqueous dispersion comprising polymeric microparticles that are curable with a crosslinking agent and heat and that are comprised of cellulose ester, a polymer formed from at least two different vinyl monomers of which at least one vinyl monomer is polyethylenically unsaturated, and surfactant, wherein the dispersion of microparticles is the product of a high stress dispersion followed by polymerization of the vinyl monomers in the presence of the cellulose ester within the microparticles; and B. crosslinking material.

13. The aqueous coating composition of claim 12 wherein the crosslinking material is an aminoplast crosslinking material.

14. The stable aqueous dispersion of claim 1 wherein the polymer formed from at least two different vinyl monomers of which at least one vinyl monomer is polyethylenically unsaturated and also one is monofunctional and the ratio of the polyethylenically unsaturated monomer content to the monofunctional vinyl monomer content is in the range from 1:200 to 9:1.

15. The stable aqueous dispersion of claim 1 wherein the cellulose ester has a butyryl content of about 15 to 57 weight percent; an acetyl content of about 0 to 34 weight percent; and a hydroxyl content of about 0.5 to 5 weight percent.

16. The stable aqueous dispersion of claim 1, wherein has a butyryl content of about 25 to 55 weight percent; an acetyl content of about 0.5 to 16 weight percent; and a hydroxyl content of about 0.5 to 3 weight percent.

17. The stable aqueous dispersion of claim 1 wherein the vinyl monomer other than the polyethylenically unsaturated vinyl monomer is selected from the group consisting of: alkyl esters of acrylic and methacrylic acid; 2-hydroxyethyl acrylate; 2-hydroxyethyl methacrylate; hydroxypropyl acrylate; hydroxypropyl methacrylate; acrylic acid; and methacrylic acid.

18. The aqueous coating composition of claim 13 wherein the cellulose ester containing aqueous dispersion is present from about 20 to 80 percent by weight of resin solids and the crosslinking material is present in an amount of about 0 to 50 percent by weight of resin solids.

* * * * *

UNITED STATES PATENT AND TRADEMARK OFFICE
CERTIFICATE OF CORRECTION

PATENT NO. : 6,046,259
DATED : April 4, 2000
INVENTOR(S) : Suryya K. Das, Soner Kilic and Robyn E. McMillan It is certified that error appears in the above-identified patent and that said Letters Patent is hereby corrected as shown below:

Column 20, Claim 16, line 41, after the word "wherein", please insert -- the cellulose ester--.

Signed and Sealed this

Twentieth Day of February, 2001

Attest:

NICHOLAS P. GODICI

Attesting Officer     Acting Director of the United States Patent and Trademark Office